(12) United States Patent
Curren et al.

(10) Patent No.: US 8,788,721 B2
(45) Date of Patent: Jul. 22, 2014

(54) MULTIPLE-SPEED INTERFACE

(75) Inventors: Chris Curren, El Segundo, CA (US);
Oliver Brique, Jongny (CH)

(73) Assignee: Nagravision S.A.,
Cheseaux-sur-Lausanne (CH)

( * ) Notice: Subject to any disclaimer, the term of this patent is extended or adjusted under 35 U.S.C. 154(b) by 496 days.

(21) Appl. No.: 13/184,831

(22) Filed: Jul. 18, 2011

(65) Prior Publication Data

US 2012/0017106 A1   Jan. 19, 2012

Related U.S. Application Data

(60) Provisional application No. 61/364,854, filed on Jul. 16, 2010.

(30) Foreign Application Priority Data

Aug. 18, 2010 (EP) .................................. 10173155

(51) Int. Cl.
*G06K 7/08* (2006.01)
*G06K 7/06* (2006.01)
*H04N 7/167* (2011.01)
*H04N 7/12* (2006.01)
*G06K 19/06* (2006.01)
*G06F 1/04* (2006.01)

(52) U.S. Cl.
CPC ....................................... *G06F 1/04* (2013.01)
USPC .................. 710/14; 713/340; 710/10; 710/18

(58) Field of Classification Search
CPC ......... H04N 7/167; H04N 7/12; G06K 19/06; G06K 7/08; G06K 7/06; G06F 1/04

USPC ................................. 713/340; 710/10, 14, 18
See application file for complete search history.

(56) References Cited

U.S. PATENT DOCUMENTS

| | | | |
|---|---|---|---|
| 2004/0178276 A1 | 9/2004 | Fruhauf et al. | |
| 2004/0178278 A1 | 9/2004 | Fruhauf et al. | |
| 2007/0210174 A1* | 9/2007 | Deprun et al. | 235/492 |
| 2008/0031449 A1* | 2/2008 | Osen et al. | 380/210 |

FOREIGN PATENT DOCUMENTS

| | | |
|---|---|---|
| EP | 1457922 | 9/2004 |
| EP | 1833006 | 9/2007 |
| EP | 1862947 | 12/2007 |

OTHER PUBLICATIONS

European Search Report issued in EP 10 17 3155, dated May 10, 2011.

* cited by examiner

*Primary Examiner* — Farley Abad
(74) *Attorney, Agent, or Firm* — DLA Piper LLP US

(57) ABSTRACT

The present invention provides a security module having a communication interface being capable of operating according to any from a selection from a plurality of predetermined operation modes or communication protocols. The security module further comprises a voltage detector to detect the voltage on the module's power supply connection. Depending on the value of the detected voltage or to which of a plurality of predetermined voltage ranges the detected voltage may be categorized, the security module is made to function according to one from the plurality of predetermined communication protocols. According to an embodiment of the present invention the plurality of communication protocols require that the security module operate at a plurality of different frequencies.

8 Claims, 2 Drawing Sheets

MULTIPLE-SPEED INTERFACE

CROSS-REFERENCE TO RELATED APPLICATIONS

This application claims priority under 35 U.S.C. §119 to U.S. provisional patent application No. 61/364,854, filed Jul. 16, 2010, and European patent application no. EP10173155.2, filed Aug. 18, 2010, the contents of which are hereby incorporated by reference herein in their entireties.

INTRODUCTION

The present invention relates to the domain of conditional access to data, in particular to data of the audio/video type intended, among others, for Pay-TV. More specifically, it concerns a security module comprising means to process an audio/video signal.

The present invention also relates to a method for processing an encrypted audio/video signal using a security module comprising means to process an audio/video signal.

STATE OF THE ART

As it is well known, in order to control access to encrypted audio/video data allowing the visualization of a Pay-TV event, such as a film, a sports event or a game in particular, several data streams are broadcast as part of an encrypted audio/video signal to a plurality of receiver/decoders each comprising a descrambler and a security module. In particular, these data streams are on one hand the file of the event in the form of encrypted audio/video content and on the other hand, a stream of control messages known as Entitlement Control Messages, or ECM messages, allowing the encrypted audio/video content to be decrypted. The audio/video content is encrypted by control words, which are regularly renewed. The ECM messages can be formed in two different ways. According to a first method, the control words are encrypted by a key, known as a transmission key, which generally pertains to the transmission system between a management centre and the security module associated with the receiver/decoder. The control word is obtained by decrypting the ECMs by means of the transmission key.

According to a second method, the ECM stream does not directly contain the encrypted control words, but rather contains information allowing for the determination of the control words. This determination of the control words can be carried out by different operations, in particular by a decryption which may lead directly to the control word, but can also lead to data which contains the control word, which must then be extracted from that data. In particular, the data can contain the control word as well as a value, associated with the content to be broadcast, and in particular the access conditions to this content. Another operation allowing the determination of the control word can use, for example, a one-way hashing function of this data in particular.

In the majority of present-day conditional access systems, the encrypted audio/video signal is captured by a receiver. The various data streams comprised in the signal are extracted and the encrypted audio/video content is sent to a descrambler for descrambling/decryption. The ECM messages are sent to a security module where they are decrypted in order to extract the control words. The control words are transmitted to the descrambler. Rather than transmitting the control words to the descrambler in clear, the control words may be sent to the descrambler in encrypted format using a key common to the security module and to the descrambler. The descrambler contains a descrambling module responsible for the decryption of the data stream with the aid of the control words.

During the decryption of a control message ECM, it is also verified, in the security module, that the right to access the content in question is present. This right can be managed by authorisation messages EMM (Entitlement Management Message) that load this right into the security module.

The encryption key for the control messages may itself be transmitted in authorisation messages EMM, in order to allow access to the control words.

The method described above, where the security module passes the control words to the descrambler, has a drawback in that it may be possible for a third party to intercept the control words as they are passed from the security module to the descrambler. Furthermore, it is not necessarily considered that the descrambler is a secure element. This may not be a big problem in the case of a broadcast programme where control words are frequently changed, but in the case where encrypted data is stored rather than broadcast, the notion of duration of the validity of the control words disappears as it is associated with the encrypted data.

In order to solve this problem, a possible solution is to decrypt the content directly in the security module. In this way keys and control words do not exit the card, because they are used directly inside the card to process the encrypted content.

At present, a large number of the security modules used in conditional access systems and in particular in conditional access systems related to Pay-TV are smart cards. Generally, such smart cards comply with the internationally accepted industry standard ISO 7816, managed jointly by the ISO (International Organisation for Standardisation) and the IEC (International Electrotechnical Commission). The ISO 7816 Standard includes specifications pertaining to the physical disposition of contacts used to interface with the smart card and specifications pertaining to the electrical characteristics and operating characteristics of the smart card.

As it is well known, the cards conforming to this standard comprise eight contacts accessible from the exterior by means Of elements which form an electrical junction with the contacts of the card when the latter is inserted into a reader. Six of the eight contacts have a function well defined by the ISO 7816 Standard. In particular, a contact VDD is responsible for providing the power supply to the card's chip, a contact GND provides the grounding of this chip, a contact RST allows resetting, a contact VPP provides the supply of the chip in programming voltage, a contact CLK allows the input of a clock signal and a contact I/O allows the input/output of data. This leaves two contacts which are not reserved for any particular function according to the ISO 7816 Standard. These contacts are referred to as being reserved for future use (RFU).

These cards are particularly adapted to a Pay-TV system since they allow the security required for this type of application to be provided. However, they suffer from a defect. They do not allow significant data processing speeds. Thus, when such cards are used to decrypt control messages ECM in order to extract the control words, their processing capacity is sufficient. However, the processing capability of these cards is not sufficient for decrypting the large data streams typically required for audio/video content.

State of the art smart cards may comply with another internationally accepted industry standard known as ISO 14443, which applies to contactless smart cards, where communication is made through RF transmission between a reader and a smart card placed sufficiently close to the reader. Transfer rates using this standard are again insufficient for decrypting the large data streams typically required for audio/video content.

At present there are cards capable of operating in two different modes according to two different communications protocols, in particular a, first mode complying with the ISO 7816 Standard and a second mode using a high speed serial communication protocol such as the USB protocol for example (Universal Serial Bus). The USB protocol allows for sufficiently fast rates to provide the processing capacity required for the accomplishment of the decryption of audio/video content. Other proprietary communications protocols similarly exist which equally allow for sufficiently fast rates to provide the processing capacity required for the accomplishment of the decryption of audio/video content. This type of proprietary communication protocol may equally be preferred as the second mode of operation.

In the smart cards conforming to the ISO 7816 Standard, two contacts of the eight existing contacts are not reserved for any precise function, and therefore can be used according to particular requirements of an application. According to the USB Standard, the data is transmitted by two wires, D+ and D−, with two other wires being provided to provide power. Certain existing smart cards thus use the two free contacts of a card complying with the ISO 7816 Standard to ensure the transfer of the data according to the USB Standard.

For a conventional application, in the ISO 7816 smart cards, the clock frequency used is generally lower than 5 MHz. The clock signal is generated in an external device then transmitted to the card via the contact CLK of the chip.

In a system using the USB protocol for audio/video signal processing, the clock frequency must not only be very accurate, but it must be relatively high. Generally, the clock frequency in USB mode is 30 MHz and the data transfer rates are 1.5 Mb/s (low speed) or 12 Mb/s (full speed) according to the USB 1 Standard and 480 Mb/s (high speed) according to the USB 2.0 Standard. The high frequency and high precision thus required in the USB mode necessitate the use of a precision oscillator such as a quartz oscillator, which needs to be integrated onto the USB module itself. When the USB module takes the form of a smart card, constraints related to volume of production and production yield in particular must be respected. This makes the manufacturing of the cards relatively complex and expensive.

Moreover, in a system capable of operating in ISO 7816 mode and in USB mode, it is necessary to manage very different frequencies in the most flexible possible way.

The document EP 1 457 922 describes a smart card that works in ISO 7816 mode and in USB mode, which is capable of switching automatically into the required mode. This automatic switching is carried out by means of the detection of a voltage on the contact D+ or D− of the chip. If a voltage is present on one of these contacts, it is considered that the smart card operates in USB mode. If no voltage is present on one of these contacts, the card operates in ISO 7816 mode.

This mechanism for detecting the mode of operation implies that it is first necessary, to generate a voltage or to suppress the voltage on the contacts D+ and D− in USB mode in order to indicate to the card that there is a mode change. The required data can only be transmitted when the mode change has been taken into account such a constraint implies that this embodiment is not adapted to an application in which the mode changes frequently, in particular when there are frequent changes from ISO 7816 mode for the processing of control messages ECM to USB mode for the processing of the audio/video stream. According to a particular embodiment of this invention, the detection of the USB mode is carried out by imposing a logical 1 on the contact CLK. It is clear that in this case, the contact is no longer available.

In European Patent Application publication number EP 1 862 947 A1 a security module capable of switching between a plurality of different communication protocols based on a detected clock frequency is described.

In European Patent Application Publication number EP 1 833 006 A2 a universal integrated circuit card (UICC) is described, which can detect a power supply voltage upon power-on. The detected value is attributed to one from a plurality of predetermined categories and the category is used to set the UICC into either a MMC or a USB communication protocol. This is done on a one-time basis at power-on.

The 7816 Standard has evolved to include various so-called classes. For example ISO 7816 Class A and ISO 7816 Class B exist for SIM cards, which may be considered to be a variant of a smart card. Class A covers SIM cards operating with a supply voltage of 5V and Class B covers SIM cards operating with a supply voltage of 3V. Class A and Class B can be considered to be the same communications protocol but with different classes, with both classes operating at different voltages. The data rates of the two, classes are of the same order of frequency. In the present invention, these different classes are considered to be different operation modes.

The present invention proposes to solve the problems perceived in the prior art by providing a security module capable of operating in one from a plurality of different operation modes in order to process audio/video data streams according to either a first communication protocol, or a second communication protocol of higher speed than the first communication protocol. This security module is furthermore capable of switching automatically from one mode of operation to another in a frequent and fast manner thereby being able to process data streams according to any of the different operation modes as and when required.

Furthermore, the present invention removes the constraints related to the integration of an oscillator onto a smart card. It is thus possible to produce a relatively cheap card while providing greater flexibility of use.

BRIEF SUMMARY OF THE INVENTION

The present invention provides a security module for processing an audio/video data stream, said security module having a communication interface being capable of operating according to any one from a plurality of predetermined operation modes. The security module comprises a voltage detector to measure the voltage on the module's power supply connection. The measured voltage is categorised into one from a plurality of predetermined voltage ranges and depending on the voltage range to which the measured voltage pertains, the security module is made to function according to one of the plurality predetermined operation modes.

It is a further aim of the present invention to provide a method for processing an audio/video signal using a security module comprising means for processing an audio/video signal, an interface having a plurality of contacts including a power supply contact and a voltage detector configured to measure a voltage on the power supply contact, said method comprising the following steps:

applying a power supply to the power supply contact,
measuring the voltage on the power supply contact,
determining a category to which the measured voltage pertains, said category being one from a plurality of predefined categories,
selecting, on a frequent basis, an operation mode from a plurality of predetermined operation modes, said selection depending on the predetermined category, said operation mode including any communication protocol from a plurality of different communication protocols or any class from a plurality of classes of a communication protocol, operating the security module according to the selected operation mode.

The security module may function with an external clock. The external clock may be multiplied in the module or divided in the module in order for different frequencies to be made available according to which of the plurality of operation modes is selected. Moreover, the detection of the operation mode (communication protocol) is carried out automatically without it being necessary to use a dedicated pin of the interface to signal a mode change.

BRIEF DESCRIPTION OF THE DRAWINGS

The present invention will be better understood thanks to the detailed description which follows and the accompanying drawings, which are given as non-limiting examples of embodiments of the invention, namely.

DETAILED DESCRIPTION

Figure 1:
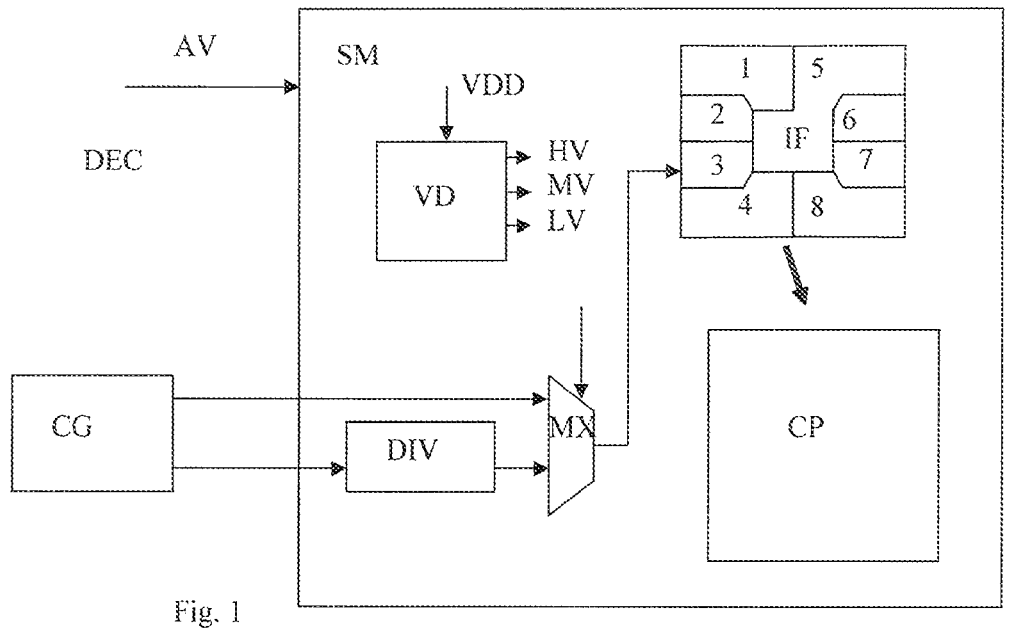
FIG. 1 showing a schematic representation of the security module configured according to a first embodiment of the present invention.
Figure 3:
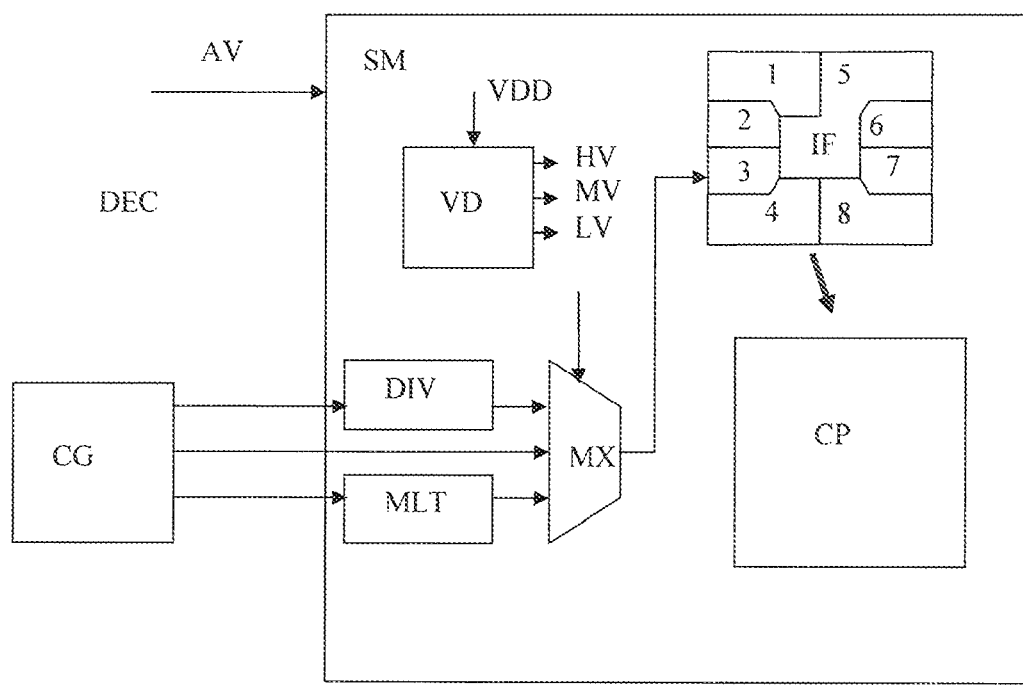
FIG. 3 showing a schematic representation of the security module configured according to a further embodiment of the present invention.

With reference to FIGS. 1 and 3, the security module (SM), according to an embodiment of the present invention, essentially comprises an interface (IF) whose pin-out complies with the ISO 7816 Standard, a processor (CP) and a voltage detector (VD). The processor (CP) includes hardware to take care of the security functions such as the decryption of ECMs and EMMs and furthermore includes hardware to take care of the decryption of the audio/video content. The output of the processor (CP) is sent for processing to an external a video processing unit (not shown).

The security module also cooperates with a clock signal generator (CG) which is external to the security module (SM) and may be placed for example in a card reader used for interfacing with the security module (SM). According to an embodiment of a conditional access system for use in the Pay-TV domain, in which an embodiment of the present invention may be deployed, the clock signal generator (CG) is placed in a decoder (DEC). The decoder (DEC) includes the smart card reader into which the security module (SM) is introduced when the assembly is in operation.

According to the ISO 7816 Standard, an interface complying with the Standard notably comprises eight contacts, numbered from 1 to 8 in the Figs. The contact having reference 1 (VDD) is the contact though which a power supply is provided to a circuit to which contact is to be made via the interface (IF). In the context of the present invention the circuit referred to here is the smart card or security module. Contact 2 (RST) allows for the resetting of the circuit. Contact 3 (CLK) allows for a clock signal to be input to the circuit. Contact 5 (GND) provides the grounding of the circuit. Contact 6 (VPP) provides a programming voltage to the circuit. Contact 7 (I/O) allows data to be input to the circuit or output from the circuit. Contacts 4 and 8 are reserved for future use and can be considered to be unused when the circuit is operating in a mode compliant with the ISO 7816 communication protocol.

As discussed previously, the circuit is adapted to be able to operate either in a first mode according to a communication protocol defined by the ISO 7816 Standard or in a second mode according to a communication protocol defined by a second standard whose frequency Of operation is significantly higher than the frequency of operation of the first mode. Examples of such standards to which the second mode of operation complies are the USB. Protocol or the LVDS protocol (Low Voltage Differential Signaling) or even a proprietary communication protocol. By way of example, typical frequencies of operation of an ISO 7816 type interface is of the order of 5 MHZ whereas the frequency of operation of a USB type interface is around 30 MHz. According to an embodiment of the present invention illustrated in FIG. 1, the clock signal generator (CG) generates signals at a sufficiently high frequency to allow the security module to operate in the mode requiring the higher of the two operating frequencies.

In order to ensure the precision necessary for reliable operation of the circuit in the operation mode requiring the higher operating frequency, the clock signal is generated externally to the security module and transmitted to the security module via the Contact 3 (CLK) of the ISO 7816 type interface. In this way there is no conflict between the requirements to mass produce reliable smart cards and the requirement to produce a highly accurate clock generator.

In order for the circuit to be able to function at the lower of the two operating frequencies, i.e. when it is operating in the mode compliant with the ISO 7816 Standard, the security module further comprises a frequency divider (DIV). As mentioned, this frequency is generally in the range of 3 to 5 MHz. As it is well known, the frequency divider (DIV) can be realised by means of a counter configured to allow a frequency at the input of the divider to be divided by any whole value, or by means of successive stages of frequency dividers dividing the frequency by 2, thus allowing the input frequency to be divided by powers of 2. The frequency divider (DIV) can also be arranged to divide the frequency of the signal at its input in order to make it compatible with the higher frequency mode if the frequency of the clock signal generated by the clock signal generator is too high for this mode.

The output of the frequency divider (DIV) is connected, via a multiplexer (MX), to Contact 3 (CLK) of the ISO 7816 type interface (IF) in order to provide the circuit with the required clock signal. As indicated in the Figure, the multiplexer (MX) allows for the output of the clock signal generator (CG) to go either directly to the chip, or indirectly, that is to say after passing through the frequency divider (DIV), according to the generated frequency and to the required frequency. It is also possible to use a frequency divider capable of carrying out different divisions according to necessity. According to a practical example, the generated frequency could be divided by 12 in order to allow the circuit to operate in ISO 7816 mode and by 2 to allow the circuit to operate in a higher frequency mode such as USB mode for example or some other proprietary higher frequency communication protocol.

The security module according to the invention also includes a voltage detector (VD) arranged to determine the value of the power supply (VDD) used or at least to distinguish a range to which the power supply voltage (VDD) belongs according to a predefined set of voltage ranges. According to one embodiment of the present invention three voltage ranges are predefined and the voltage detector is capable of distinguishing the detected supply voltage (VDD)

as belonging to one of the three ranges, namely 2.25V-2.75V (LV), 3V-3.6V (MV) or 4.5V-5.5V (HV). Ideally, the three voltage ranges are separated, so that there is no risk of confusion possible between them. According to the embodiment of the present invention, when the circuit is operating in a mode compatible with the ISO 7816 Class A protocol, the power supply will be within the highest of the three voltage ranges (HV). Similarly, when the circuit is operating in a mode compatible with the ISO 7816 Class B protocol, the power supply will be within the mid voltage range (MV). When the circuit is operating in a mode compatible with a second protocol, having a higher frequency than the ISO 7816 protocol, the power supply will be within the lowest of the three voltage ranges (LV). The voltage detector can therefore be used to determine the mode of operation of the circuit. According to the determined mode of operation of the circuit, the multiplexer (MX) is controlled in such a way as to switch the appropriate clock signal to the processor (CP).

Figure 2:
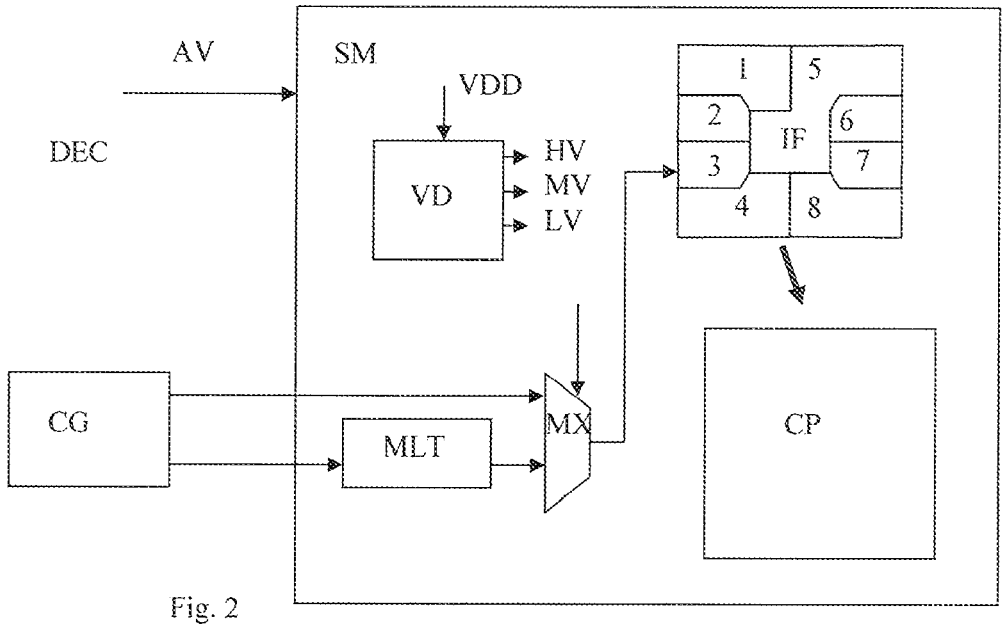
FIG. 2 showing a schematic representation of the security module configured according to another embodiment of the present invention.

FIG. 2 shows an embodiment in which the security module of the present invention includes a frequency multiplier (MLT) in place of the divider (DIV) of FIG. 1. In this case, instead of using a clock signal generator (CG) that provides a frequency compatible with the operating mode requiring the highest frequency, the generator provides a signal having the lowest frequency. This signal can be sent directly to the processor in the case of operating according to the ISO 7816 Standard or can be sent to the frequency multiplier. The latter then multiplies the frequency by a value that makes it compatible with operating in USB mode or in LVDS mode or some other proprietary mode.

In the examples mentioned in the present application, it is indicated that the frequency in USB mode is 30 MHz. According to the frequency of the clock generator and the characteristics of the multiplier, the frequency with which the contact CLK of the chip is provided can be different to 30 MHz. Such a different frequency could be used since the decoder and the smart card both use the same frequency.

FIG. 3 shows a practical embodiment that is a combination of the embodiments of FIGS. 1 and 2. The security module simultaneously includes a frequency divider (DIV) and multiplier (MLT).

This security module presents the advantage that It can be used indifferently with an apparatus generating a clock frequency compatible with the ISO 7816 protocol or with an apparatus generating a clock frequency compatible with a protocol using a higher frequency than the ISO 7816 protocol. When the generated frequency corresponds to mode requiring the higher frequency, the invention device uses the frequency divider to generate the clock frequency compatible with ISO 7816 mode. When the generated clock frequency corresponds to ISO 7816 mode, the device uses the frequency multiplier to generate a high frequency corresponding to the mode which is compatible with higher operating frequencies.

It is also possible to make provision for the signals generated by the clock signal generator to have an intermediate frequency between the frequency used in ISO 7816 mode and that corresponding to USB mode, for example 15 MHz. In this case, when the device operates in ISO 7816 mode, the signals of the clock signal generator are transmitted to the frequency divider before being sent to the card. On the contrary, when the device operates in USB mode, the signals of the generator are sent to the frequency multiplier before being sent to the card.

According to a variant, the smart card can support different serial communication modes such as for example USB and LVDS. The clock signal can be generated at a frequency required by the communication mode requiring the lowest frequency, i.e. the ISO 7816 mode. In this case, a first multiplication stage is used to generate a frequency that is compatible with the intermediate mode, i.e. the USB mode in our example. A second multiplication stage is further used to generate a higher frequency that is compatible with the mode requiring the highest frequency, i.e. the LVDS mode.

It is also possible to generate an intermediate frequency and to use a frequency divider to generate a lower frequency and a frequency multiplier to generate a higher frequency. Similarly, it is possible to generate a frequency at least as high as the frequency required for the mode requiring the highest frequency and to use two dividers to generate lower frequencies.

When the security device has determined in which operating mode it must work, it carries out the required operations in a conventional way. As soon as the clock frequency has changed, the operating mode also changes and the processing of the information is adapted consequently.

In the device according to the invention, there is no particular management of the operating mode of the processor. It is only necessary to act on changes to the power supply voltage to the power supply contact of the security module (and thereby acting on the clock frequency seen by the security module) after the initial detection and mode selection on power up so that changes in the operating mode are immediately or rapidly detected and the new operating mode is immediately or rapidly selected. In this way the detection and therefore the mode switching can be done on a continuous basis while the security module is operating. Detection on a "continuous basis" includes generally detecting on a frequent basis, as described hereafter, during the operation of the security module. In embodiments for use in a Pay TV application and targeted towards switching the mode of operation relative to the speed capability of an interface, "on a frequent basis" can mean at intervals compatible with a possible switching of operation from one mode to another, such as when switching between reception of content from one operator or channel to reception of content from another operator or channel for example. It will be understood by the man of ordinary skill in the art that detection of a change in the power supply voltage and switching to the corresponding new mode of operation should be performed quickly so that the switching delay is tolerable to a user and more preferably should be performed so that the switching delay is not noticeable to the user. The frequency could then be described in terms of an event driven phenomenon such as changing between channels for example. In other embodiments of the present invention the voltage detection could be executed on a periodic or polled basis such as every two seconds or every quarter of a second for example. This presents the advantage that it is possible to change the operating mode very frequently, which is necessary in particular in an application such as Pay-TV in which the change between the processing of the data stream requiring operating in USB, LVDS or other higher frequency modes and processing the control messages requiring operating in ISO 7816 mode is frequent and must be fast. In other words, upon power on of the device or at some predetermined time following startup, as part of a bootstrap process for example, the voltage on the power supply pin is detected and depending on the category to which that measured voltage belongs the device is made to function according to one of the predetermined operating modes. During the functioning of the device, if the supply voltage moves and it detected as belonging to a different category, then the device is caused to switch to another of the predetermined operating modes. This process continues whereby any time the supply voltage changes to be in another category the device is switched to function according to another operation mode.

The present invention has been described with reference to an embodiment in which the security device takes the form of a smart card. It is however also possible for this device to take another form, for example the form of a key or of any object.

According to a particular case, it is possible to foresee that one of the operating modes, for example the USB mode, is inactive by default and that it is necessary to send a particular command to activate this mode.

According to an embodiment of the present invention, using the same physical connections as discussed above, communication between a host device and a security module according to one of a plurality of different communication protocols involving substantially different clocking frequencies is facilitated. According to this embodiment, a negotiation between the host device and the security module is carried out. Indeed, whenever the smartcard reader starts up or whenever the smartcard is inserted into the reader of the host device, the two mentioned parties communicate their respective capabilities with each other via a predefined protocol. Using the data relative to the capabilities, it is a simple task for a processor in the host device or a processor on the smartcard to determine the best set of working conditions which will be acceptable to both parties. The resulting best conditions would result in a communication session being set up between both parties, which could range anywhere from a low-speed legacy ISO 7816 protocol to a very high speed protocol. This process is known as negotiation. The power supply voltage imposed by the card reader will then be chosen as a result of this negotiation in order to set the power supply to the appropriate range for the negotiated communication frequency.

According to this embodiment of the present invention, the negotiation between the two parties results in the card reader determining a voltage level to be used for the power supply pad, thereby forcing the protocol to one of the predetermined protocols based on the power supply voltage detected by the smartcard.

Another solution to the problem of having a host device automatically adjusting itself to operate according to a communication protocol or operating mode involves the use of a separate pad or pads other than the eight pads on a standard ISO 7816 interface. According to this solution, the smartcard features two physically separate pads—one for low-bandwidth communication and one for high-bandwidth communication. The first of these two pads could be one of the already existing communication pads from the standard. ISO 7816 interface for example. This first pad would be used for low-bandwidth communication. The second pad would be used for high-bandwidth communication and would be positioned close to the chip but at a position which would allow a card reader to detect that it is an extra pad, distinct from the first pad. When the smartcard reader starts up or when the smartcard is inserted into an active reader, the reader detects the positions of the second pad relative to the first one i.e. the standard one. According to a predefined protocol, the position of the second extra pad relative to the position of the first pad gives a code which correlates to the bit rate or clock rate capabilities of the module on the card. In this way the reader can be informed as to the best data rate it can use in communicating with the module and switch to that rate. In general, the second pad should be very close to the smartcard chip and could even be placed on the opposite side of the card for example.

According to another embodiment of the present invention with the extra pad as described above, the negotiation is achieved through the detection of the position of the second pad by the card reader. The result of this negotiation indicates to the reader that it should set the power supply voltage pad to one of the pre-defined voltage ranges, thereby setting the reader into one of the predefined communication protocols so that the communication between the card and the reader can continue at the required bit-rate.

The invention claimed is:

1. A security module comprising:
a processor configured to process at least one audio/video data stream;
an interface comprising a plurality of contacts including a power supply contact and a clock contact configured to receive a clock signal;
a frequency divider configured to divide a frequency of the clock signal to generate a divided clock signal, a frequency multiplier configured to multiply the frequency of the clock signal to generate a multiplied clock signal, or both;
a voltage detector configured to measure a voltage on the power supply contact and to categorize the measured voltage as pertaining to one from a plurality of predetermined voltage ranges; and
a multiplexer configured to select between the received clock signal or divided clock signal or multiplied clock signal for operating the security module;
wherein said security module is configured to function according to any one from a plurality of predetermined operation modes, each of the predetermined operation modes having a frequency of operation corresponding to a frequency of one of the received clock signal, divided clock signal, or multiplied clock signal, the predetermined operation modes including any communication protocol from a plurality of different communication protocols or any class from a plurality of classes of a communication protocol; and
wherein the security module is configured to monitor for a change in a category of the measured voltage from the voltage detector following power-on and, when the security module detects the change in the category, to switch to a different one from the plurality of operating modes and to cause the multiplexer to select between the received clock signal or divided clock signal or multiplied clock signal corresponding to the different one from the plurality of operation modes.

2. The security module according to claim 1, wherein the plurality of contacts are positioned in such a way as to be compatible with the International Standard ISO 7816 according to at least the physical characteristics described therein, said physical characteristics including at least the dimensions and locations of the contacts described therein.

3. The security module according to claim 1, wherein at least one parameter characterising any of the plurality of operation modes is a frequency of operation, the frequency of operation of at least one of the operation modes being compatible with the International Standard ISO 7816.

4. The security module according to claim 3, wherein the frequency of operation of at least one of said plurality of operation modes is higher than the frequency of operation of any one of the remaining operation modes from the plurality of operation modes.

5. The security module according to claim 1, wherein at least one of the plurality of operation modes makes use of at least one from the plurality of contacts defined as RFU (Reserved for Future Use) according to the International Standard ISO 7816.

6. A method for processing an audio/video signal using a security module comprising a processor configured to process the audio/video signal, an interface comprising a plurality of contacts including a power supply contact and a clock contact configured to receive a clock signal, a frequency divider configured to divide a frequency of the clock signal to generate a divided clock signal, a frequency multiplier configured to multiply the frequency of the clock signal to generate a multiplied clock signal, or both, a voltage detector configured to measure a voltage on the power supply contact, and a multiplexer configured to select between the received clock signal or divided clock signal or multiplied clock signal for operating the security module, said method comprising:

powering the security module via the power supply contact;

measuring a voltage on the power supply contact;

determining a category to which the measured voltage pertains, said category being one from a plurality of predetermined categories;

selecting an operation mode from a plurality of predetermined operation modes, said selection depending on the determined category, each of the predetermined operation modes having a frequency of operation corresponding to a frequency of one of the received clock signal, divided clock signal, or multiplied clock signal, the predetermined operation modes including any communication protocol from a plurality of different communication protocols or any class from a plurality of classes of a communication protocol;

selecting between the received clock signal or divided clock signal or multiplied clock signal with the multiplexer corresponding to the selected operation mode; and operating the security module according to the selected operation mode.

7. The method for processing an audio/video signal according to claim 6, further comprising:

monitoring the category of the measured voltage from the voltage detector;

switching to a different one from the plurality of operation modes upon a change in the category of the measured voltage;

selecting between the received clock signal or divided clock signal or multiplied clock signal with the multiplexer corresponding to the different one from the plurality of operation modes; and operating the security module according to the different one from the plurality of operation modes.

8. A system for decoding an audio/video data stream, said system comprising:

a decoder comprising:

a security module interface configured to interface with a security module, said security module interface comprising a least a power terminal configured to supply power to the security module and a clock terminal configured to supply a clock to the security module;

a clock generator configured to generate a first clock having a first clock frequency and connected to supply the first clock to the clock terminal; and a power supply connected to supply power to the power terminal;

wherein the decoder is configured to set a voltage supplied to the power terminal to correspond to one from a plurality of predetermined voltage ranges, each of the predetermined voltage ranges corresponding to a communication protocol from a plurality of different communication protocols or a class from a plurality of classes of a communication protocols; and the security module comprising:

a processor configured to process the audio/video data stream;

an interface comprising a plurality of contacts including a power supply contact configured to interface with the power terminal of the security module interface and a clock contact configured to interface with the clock terminal of the security module interface and receive the first clock;

a frequency divider configured to divide a frequency of the first clock to generate a divided clock signal, a frequency multiplier configured to multiply the frequency of the first clock to generate a multiplied clock signal, or both;

a voltage detector configured to measure a voltage on the power supply contact and to categorize the measured voltage as pertaining to one from the plurality of predetermined voltage ranges; and a multiplexer configured to select between the first clock or divided clock signal or multiplied clock signal for operating the security module;

wherein said security module is configured to function according to any one from a plurality of predetermined operation modes, each of the predetermined operation modes having a frequency of operation corresponding to a frequency of one of the received clock signal, divided clock signal, or multiplied clock signal, the predetermined operation modes including any communication protocol from a plurality of different communication protocols or any class from a plurality of classes of a communication protocol; and wherein the security module is configured to monitor for a change in a category of the measured voltage from the voltage detector following power-on and, when the security module detects the change in the category, to switch to a different one from the plurality of operating modes and to cause the multiplexer to select between the first clock or divided clock signal or multiplied clock signal corresponding to the different one from the plurality of operation modes.

\* \* \* \* \*